(12) United States Patent
Chun et al.

(10) Patent No.: US 12,555,242 B2
(45) Date of Patent: Feb. 17, 2026

(54) ELECTRONIC DEVICE AND METHOD FOR IMAGE SEGMENTATION BASED ON DEEP LEARNING

(71) Applicant: SAMSUNG ELECTRONICS CO., LTD., Suwon-si (KR)

(72) Inventors: Hyungju Chun, Suwon-si (KR); Youngjo Kim, Suwon-si (KR); Hyunhee Park, Suwon-si (KR); Arang Lee, Suwon-si (KR); Sungjun Lim, Suwon-si (KR); Jongbum Choi, Suwon-si (KR); Changsu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 18/105,519

(22) Filed: Feb. 3, 2023

(65) Prior Publication Data
US 2023/0186480 A1    Jun. 15, 2023

Related U.S. Application Data

(63) Continuation of application No. PCT/KR2021/010134, filed on Aug. 3, 2021.

(30) Foreign Application Priority Data

Aug. 3, 2020  (KR) .................. 10-2020-0096966

(51) Int. Cl.
*G06T 7/11* (2017.01)
*G06T 3/40* (2024.01)
*G06T 7/174* (2017.01)

(52) U.S. Cl.
CPC .................. *G06T 7/11* (2017.01); *G06T 3/40* (2013.01); *G06T 7/174* (2017.01); *G06T 2207/20081* (2013.01)

(58) Field of Classification Search
CPC ... G06T 7/11; G06T 3/40; G06T 7/174; G06T 2207/20081; G06T 2207/20084; G06T 7/136

See application file for complete search history.

(56) References Cited

U.S. PATENT DOCUMENTS 9,536,280 B2 *   1/2017   Kamimura ........... H04N 7/0125
9,760,813 B2 *   9/2017   Iwata ................. H04N 1/40068
(Continued)

FOREIGN PATENT DOCUMENTS

KR    10-2018-0067909      6/2018
KR    10-2018-0118458      10/2018
(Continued)

OTHER PUBLICATIONS

International Search Report for PCT/KR2021/010134 dated Nov. 26, 2021, 6 pages with English Translation.
(Continued)

*Primary Examiner* — Mia M Thomas
(74) *Attorney, Agent, or Firm* — Nixon & Vanderhye P.C.

(57) ABSTRACT

A method for image segmentation based on deep learning in an electronic device includes: acquiring, by a processor of the electronic device, an input image, converting, by the processor, the input image into a first image having a first resolution and a second image having a second resolution, performing, by the processor, first image processing for the first image using a first deep learning engine, performing, by the processor, second image processing for the second image using a second deep learning engine different from the first deep learning engine, and providing, by the processor, region segmentation information of the input image based on first region segmentation information associated with the first image processing and second region segmentation information associated with the second image processing.

18 Claims, 6 Drawing Sheets

(56) References Cited

U.S. PATENT DOCUMENTS

| | | |
|---|---|---|
| 9,972,092 B2 | 5/2018 | Lin et al. |
| 10,366,494 B2 | 7/2019 | Seong et al. |
| 10,614,574 B2 | 4/2020 | Zhang |
| 12,165,292 B2* | 12/2024 | Zhang ................. G06T 7/194 |
| 12,169,936 B2* | 12/2024 | Chaurasia ............ G06N 3/045 |
| 2017/0011282 A1* | 1/2017 | Iwasaki ............... G03G 15/043 |
| 2018/0012365 A1 | 1/2018 | Chefd'Hotel et al. |
| 2019/0114774 A1* | 4/2019 | Zhang ................. G06N 3/08 |
| 2019/0205700 A1 | 7/2019 | Gueguen |
| 2019/0251401 A1* | 8/2019 | Shechtman ........... G06V 10/82 |
| 2019/0392211 A1* | 12/2019 | Hartman ............... G06T 11/00 |
| 2020/0005122 A1 | 1/2020 | Fan et al. |
| 2020/0105399 A1* | 4/2020 | Laaksonen ............ G06N 3/08 |
| 2020/0134772 A1* | 4/2020 | Poudel Karmatha ........................ G06N 3/0495 |
| 2020/0175729 A1* | 6/2020 | Lee ..................... G06N 3/045 |
| 2020/0211209 A1* | 7/2020 | Liao ..................... G06T 7/55 |
| 2020/0294239 A1* | 9/2020 | Brada .................. G06T 7/10 |
| 2021/0133956 A1* | 5/2021 | Chen .................... G06T 3/40 |
| 2022/0044366 A1* | 2/2022 | Zhang .................. G06N 3/08 |
| 2022/0222791 A1* | 7/2022 | Zhang .................. G06T 5/40 |
| 2022/0261960 A1* | 8/2022 | Wang .................. G06T 3/4046 |
| 2022/0335709 A1* | 10/2022 | Yang .................... G06N 3/0442 |
| 2022/0350968 A1* | 11/2022 | Rossi ................... G06N 3/08 |
| 2023/0020911 A1* | 1/2023 | Laaksonen ........... A61N 5/1039 |
| 2023/0021110 A1* | 1/2023 | Tsai .................... G06T 7/12 |
| 2023/0097950 A1* | 3/2023 | Burger ................. H04N 7/18 348/148 |
| 2023/0162316 A1* | 5/2023 | Kim .................... G06N 3/08 382/307 |
| 2023/0186480 A1* | 6/2023 | Chun ................... G06T 7/174 382/100 |
| 2023/0281763 A1* | 9/2023 | Zhang ................. G06N 3/045 382/260 |
| 2024/0193903 A1* | 6/2024 | Kligys ................. G06V 10/25 |
| 2025/0046269 A1* | 2/2025 | Lee ..................... G09G 5/005 |
| 2025/0104399 A1* | 3/2025 | Wang .................. G06V 10/7715 |
| 2025/0118050 A1* | 4/2025 | Baker .................. G06V 10/82 |

FOREIGN PATENT DOCUMENTS

| | | | |
|---|---|---|---|
| KR | 10-2020-0017607 | 2/2020 | |
| KR | 10-2020-0063349 | 6/2020 | |
| KR | 10-2020-0068083 | 6/2020 | |
| WO | WO-2022030943 A1 * | 2/2022 | ............ G06T 7/174 |
| WO | WO-2022137921 A1 * | 6/2022 | ............ G06T 7/00 |

OTHER PUBLICATIONS

Written Opinion of the ISA for PCT/KR2021/010134 dated Nov. 26, 2021, 8 pages with English Translation.

* cited by examiner

ELECTRONIC DEVICE AND METHOD FOR IMAGE SEGMENTATION BASED ON DEEP LEARNING

CROSS-REFERENCE TO RELATED APPLICATIONS

This application is a continuation of International Application No. PCT/KR2021/010134 designating the United States and filed in the Korean Intellectual Property Receiving Office on Aug. 3, 2021, and claiming priority to Korean Patent Application No. 10-2020-0096966, filed on Aug. 3, 2020 in the Korean Intellectual Property Office, the disclosures of which are incorporated by reference herein in their entireties.

BACKGROUND

Field

The disclosure relates to a method and electronic device for processing image segmentation through deep learning.

Description of Related Art

Research is actively being conducted on image segmentation technologies through image analysis in computer vision related various fields (e.g., an autonomous vehicle and a medical equipment).

The image segmentation technologies are being variously developed in the form of segmenting objects within an image by a meaningful unit or predicting a region of each pixel within the image, etc.

Technologies related to classifying an object and a background within an image, classifying objects of the same kind, and classifying all of independent objects exist.

In a conventional electronic device using deep learning, when a bit depth is decreased at the time of image segmentation processing, a quantization error is increased and accordingly to this, the performance of the electronic device on image segmentation is deteriorated.

In the conventional electronic device using the deep learning, there was a problem in which when a resolution of an input image is decreased, a segmentation performance of a detailed portion is deteriorated and when the resolution of the input image is increased, a processing time is increased and thus it is difficult to be applied to the electronic device whose operation capability is limited.

SUMMARY

According to various embodiments, even while a high bit depth and resolution are applied, the processing time can be maintained or decreased. Because the high bit depth and resolution are applied, the quantization error or the problem of deteriorating the performance of the detailed portion can be addressed.

According to an example embodiment, a method for image segmentation based on deep learning in an electronic device of an embodiment can include: acquiring an input image by a processor of the electronic device, and converting, by the processor, the input image into a first image having a first resolution and a second image having a second resolution, and performing, by the processor, first image processing for the first image using a first deep learning engine, and performing, by the processor, second image processing for the second image using a second deep learning engine different from the first deep learning engine, and providing, by the processor, region segmentation information of the input image based on first region segmentation information associated with the first image processing and second region segmentation information associated with the second image processing.

An electronic device according to an example embodiment can include: a memory, and a processor operably connected to the memory. The processor can be configured to: acquire an input image, convert the input image into a first image having a first resolution and a second image having a second resolution, perform first image processing for the first image using a first deep learning engine, perform second image processing for the second image using a second deep learning engine different from the first deep learning engine, and provide region segmentation information of the input image based on first region segmentation information associated with the first image processing and second region segmentation information associated with the second image processing.

According to various example embodiments, an electronic device and method for, even while maintaining a processing time applicable to an electronic device, addressing a quantization error of image segmentation and a performance deterioration of a detailed portion can be provided.

An effect obtainable based on various embodiments is not limited to the above-mentioned effects, and other effects not mentioned will be able to be apparently understood from the following statement by a person having ordinary skill in the art to which the present disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
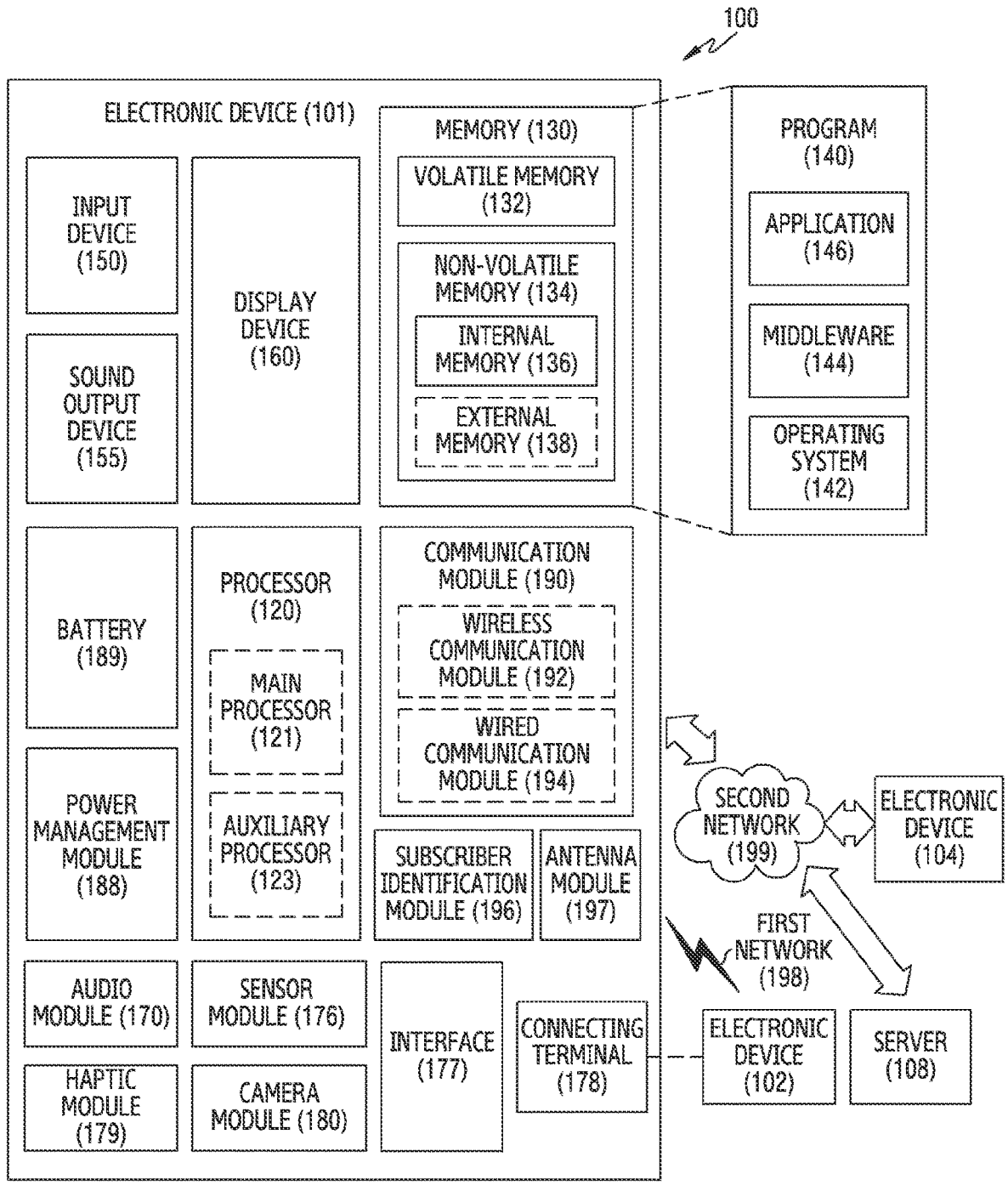
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
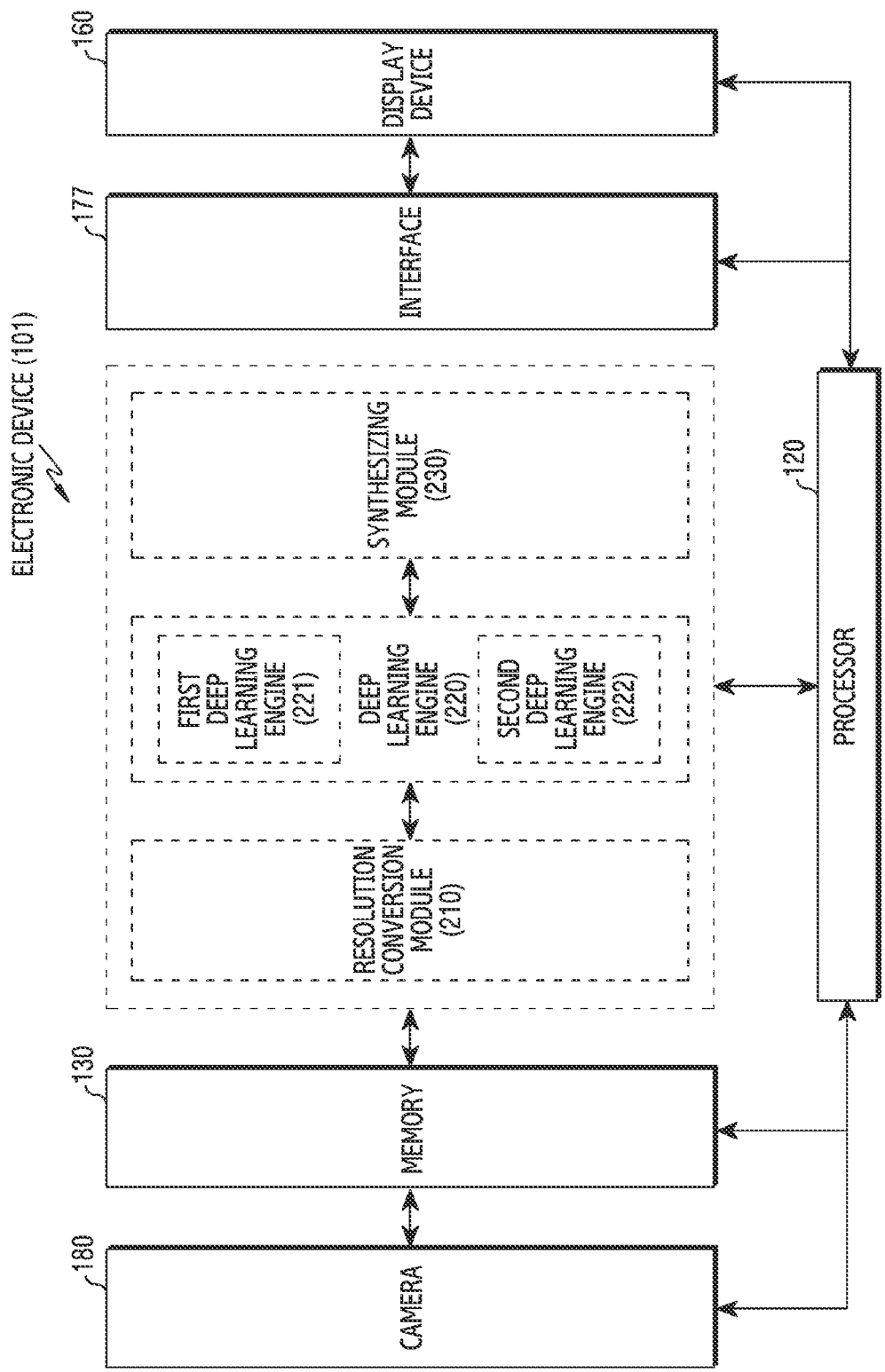
FIG. 2 is a diagram illustrating an example configuration of an electronic device according to various embodiments.

FIG. 2 is a diagram illustrating an example configuration of the electronic device 101 according to various embodiments.

The electronic device 101 of an embodiment can at least include a processor (e.g., including processing circuitry) 120, a memory 130, a display device (e.g., including a display) 160, an interface (e.g., including interface circuitry) 177, and a camera 180.

The processor 120 may include various processing circuitry and control the memory 130, the display device 160, the interface 177, and the camera 180. Also, the processor 120 can include a graphics processing unit (GPU) and/or a digital signal processor (DSP).

The electronic device 101 of an embodiment can include and/or implement a resolution conversion module (e.g., including various processing circuitry and/or executable program instructions) 210, a deep learning engine (e.g., including various processing circuitry and/or executable program instructions) 220, and a synthesizing module (e.g., including various processing circuitry and/or executable program instructions) 230. For example, the processor 120 can execute a program or instructions stored in the memory 130, thereby implementing the resolution conversion module 210, the deep learning engine 220, and the synthesizing module 230 in a software scheme. According to an embodiment, the electronic device 101 can include hardware modules each corresponding to the resolution conversion module 210, the deep learning engine 220, and the synthesizing module 230. In some embodiments, at least one of the resolution conversion module 210, the deep learning engine 220, and the synthesizing module 230 can be implemented as a software module, and another at least one can be done as a hardware module as well.

In an embodiment, the processor 120 can control the resolution conversion module 210, the deep learning engine 220, and the synthesizing module 230. Also, the resolution conversion module 210, the deep learning engine 220, and the synthesizing module 230 each can be connected to each other and can perform an operation relating to image segmentation according to the control of the processor 120.

The resolution conversion module 210 of an embodiment can convert a resolution of an input image that the electronic device 101 acquires. Also, the resolution conversion module 210 can convert a whole resolution of the input image acquired by the electronic device 101 as well, and convert a partial resolution of the input image as well.

The deep learning engine 220 of an embodiment can process image segmentation based on deep learning. An operation of image segmentation of the deep learning engine 220 is described in greater detail below with reference to FIGS. 3, 4, 5 and 6.

In an embodiment, the deep learning engine 220 can include a first deep learning engine 221 and a second deep learning engine 222. The first deep learning engine 221 and the second deep learning engine 222 each can perform an operation of image segmentation the deep learning engine 220 performs.

In an embodiment, the deep learning engine 220 is not limited to the aforementioned first deep learning engine 221 and second deep learning engine 222, and can include three or more deep learning engines (e.g., the first deep learning engine 221, the second deep learning engine 222, and a third deep learning engine) as well.

The synthesizing module 230 of an embodiment can synthesize result data of image segmentation which is processed based on the deep learning engine 220.

In an embodiment, the first deep learning engine 221 and second deep learning engine 222 of the electronic device 101 can perform image segmentation for an input image, to provide result data (e.g., first region segmentation information and second region segmentation information). Also, the result data (e.g., the first region segmentation information and the second region segmentation information) can include background data and foreground data.

According to an embodiment, the electronic device 101 can include other constructions which are not illustrated in FIG. 2. For example, the electronic device 101 can include a sensor data encoding module (not shown) for compressing sensor data as well.

Figure 3:
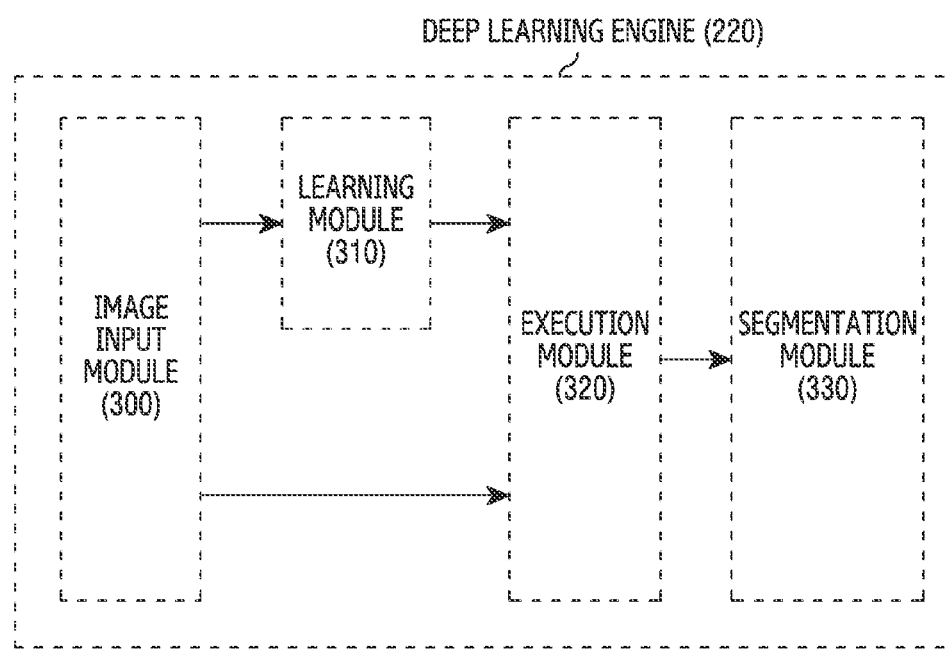
FIG. 3 is a diagram illustrating an example configuration of a deep learning engine according to various embodiments.

FIG. 3 is a diagram illustrating an example configuration of the deep learning engine 220 according to various embodiments.

The deep learning engine 220 of an embodiment can include an image input module (e.g., including various processing circuitry and/or executable program instructions) 300, a learning module (e.g., including various processing circuitry and/or executable program instructions) 310, an execution module (e.g., including various processing circuitry and/or executable program instructions) 320, and a segmentation module (e.g., including various processing circuitry and/or executable program instructions) 330. The deep learning module 220 can perform deep learning that is based, for example, and without limitation, on a convolutional neural network (CNN). The deep learning engine 220 shown in FIG. 3 is illustrative, and a deep learning engine of a suitable form can be applied in various embodiments proposed in the present disclosure.

The image input module 300 of an embodiment can acquire an image for performing image segmentation that is based on deep learning. For example, the image acquired by the image input module 300 can be an image for which resolution conversion is carried out by a resolution conversion module (e.g., the resolution conversion module 210).

The learning module 310 of an embodiment can receive the image (e.g., the image for which the resolution conversion is performed) acquired by the deep learning engine 220 from the image input module 300. Also, the learning module 310 can receive the image (e.g., the image for which the resolution conversion is performed) acquired by the deep learning engine 220 from the image input module 300 continuously at many times.

In an embodiment, the learning module 310 can provide learning information through deep learning, and forward the learning information to the execution module 320.

In an embodiment, by, for example, repeatedly performing a convolution process and a pooling process, the learning module 310 can perform deep learning, and can provide learning information. For example, the learning module 310 can repeat the convolution and pooling processes for an acquired image for which resolution conversion is performed, thereby obtaining abstracted information (e.g., object information, background information, and/or color information). Also, the learning module 310 can perform CNN-based learning.

In an embodiment, the learning module 310 can obtain a feature of an acquired image using a plurality of filters in a convolution process. In obtaining the feature of the acquired image by the learning module 310, a filter parameter can be used. For example, the filter parameter can be a parameter for obtaining the feature of the acquired image. The filter parameter may include a square matrix such as a 4×4 matrix or a 3×3 matrix.

In an embodiment, the learning module 310 can sequentially move data about an acquired image at a specified interval (e.g., stride) based on a filter, while performing convolution by channel. For example, a color image can be three-dimension data which is based on red (R), green (G), and blue (B) of each pixel. The color image can include three channels corresponding to R, G, and B. In this case, the learning module 310 can provide, as a feature map, a sum of convolution for each channel (e.g., three channels in the color image) for the data about the acquired image.

In an embodiment, the learning module 310 can perform convolution, thereby providing a feature map, and also can additionally apply an activation function to the feature map, to provide an activation map.

In an embodiment, in response to the acquired image including a plurality of channels, the learning module 310 can provide a feature map for each channel, and can sum up the feature map of each channel, thereby providing a final feature map.

In an embodiment, the learning module 310 can maintain a feature of an acquired image while decreasing a dimension, through, for example, a pooling process after a convolution process. For example, the learning module 310 can perform non-linear down sampling in the pooling process, and can decrease the number of parameters (e.g., filter parameters) to learn, thereby simplifying an output. Also, in the pooling process, the learning module 310 can decrease a size of an activation map or emphasize specific data.

The execution module 320 of an embodiment can receive an image (e.g., an image for which resolution conversion is performed) the deep learning engine 220 acquires from the image input module 300. Also, the execution module 320 can receive learning information (e.g., learning information including abstracted information (e.g., object information, background information, and color information)) from the learning module 310. The processing of image segmentation can be performed based on the learning information and the image the deep learning engine 220 acquires from the image input module 300.

The segmentation module 330 of an embodiment can segment an image based on the image segmentation processing of the execution module 320. The aforementioned image segmentation, for example, can be segmenting a boundary of an object within the image and a region other than the boundary, a character and a region other than the character, a bright region and a dark region, and/or a complex region and a simple region. A criterion of the regions can be set by a user, and can have been already set to the electronic device 101 as well.

The first deep learning engine 221 and the second deep learning engine 222 of an embodiment can each include constructions corresponding to constructions (e.g., the image input module 300, the learning module 310, the execution module 320, and the segmentation module 330) of the deep learning engine 220. The constructions can perform an operation or processing corresponding to an operation or processing performed by the learning module 310, the execution module 320, and the segmentation module 330.

In an embodiment, the aforementioned deep learning operations of the image input module 300, the learning module 310, the execution module 320, and the segmentation module 330 can be performed within the electronic device 101. And, information about the aforementioned deep learning operations of the image input module 300, the learning module 310, the execution module 320, and the segmentation module 330 carried out outside the electronic device 101 can be input to the electronic device 101 as well. In response to the information about the deep learning operations carried out outside the electronic device 101 being input to the electronic device 101, the electronic device 101 can perform the processing of an input image described in greater detail below under the control of the processor 120.

In an embodiment, the image input module 300, the learning module 310, the execution module 320, and the segmentation module 330 of the electronic device 101 can perform the aforementioned deep learning operations within the electronic device 101, and the learning module 310 can perform the aforementioned deep learning operations outside the electronic device 101. In this case, information about the deep learning operations of the learning module 310 carried out outside the electronic device 101 can be input to the electronic device 101, and the electronic device 101 can perform the processing of an input image described later according to the control of the processor 120.

Figure 4:
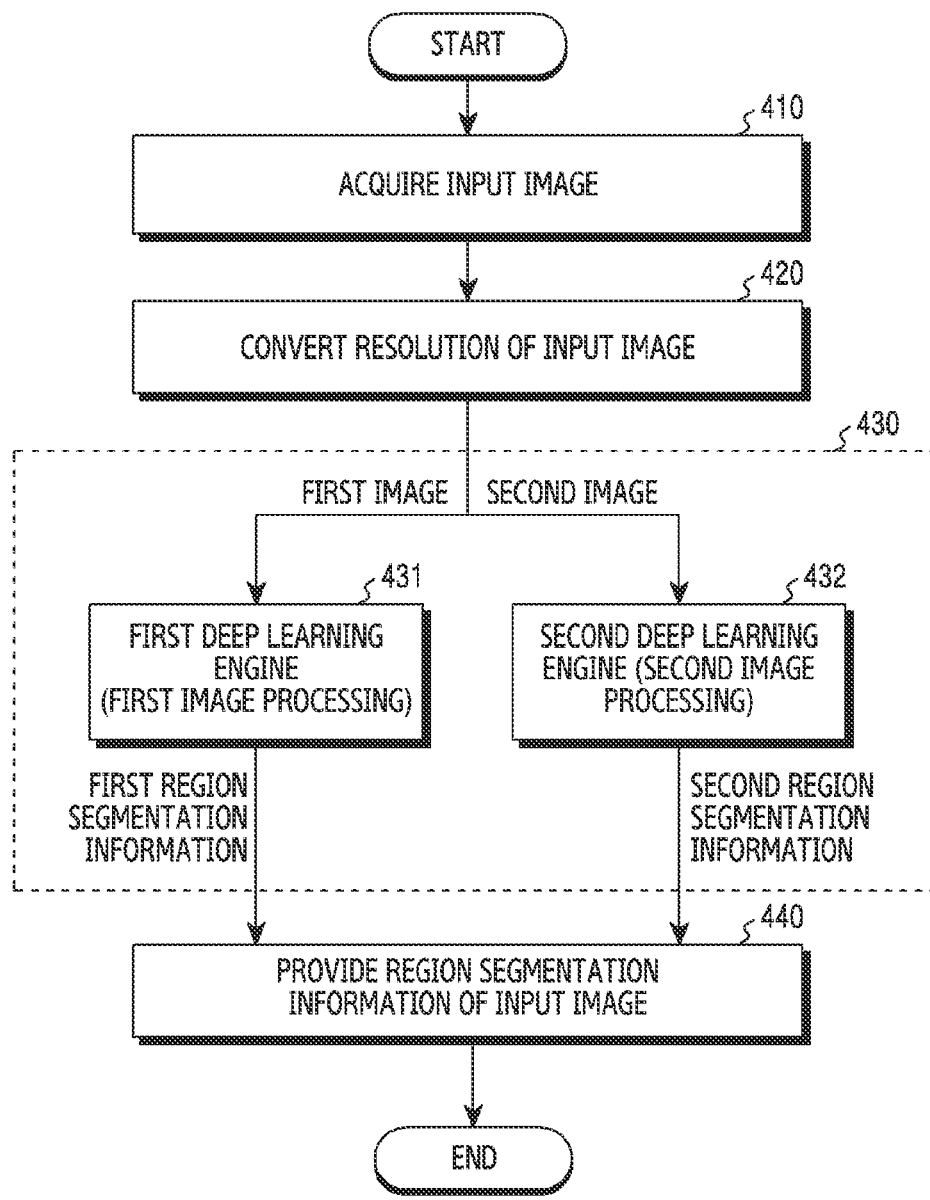
FIG. 4 is a flowchart illustrating an example process of providing an output image from an input image in an electronic device according to various embodiments.

FIG. 4 is a flowchart illustrating an example process of providing region segmentation information of an input image from the input image in the electronic device 101 according to various embodiments.

According to an embodiment, in operation 410, the electronic device 101 can acquire an input image under the control of the processor 120. The electronic device 101 can acquire various images related to the input image using the camera module 108, and can forward the input image to the resolution conversion module 210 using the processor 120.

In an embodiment, the input image can be one image, and can be a plurality of images as well.

In an embodiment, the input image or the plurality of images forwarded to the resolution conversion module 210 can be a photographed image in which the electronic device 101 performs photographing through a user's photographing command. Also, the input image or the plurality of input images can be a preview image acquired through a sensor (e.g., an image sensor (not shown) of the camera module 180) of the electronic device 101 as well. The electronic device 101 can store the input image or the plurality of input images in the memory 130.

According to an embodiment, in operation 420, the processor 120 of the electronic device 101 can convert a resolution of the input image.

In an embodiment, the electronic device 101 can convert the resolution of the acquired input image into mutually different two or more resolutions by the control of the processor 120. For example, the processor 120 of the electronic device 101 can control the resolution conversion module 210 and, in response to the resolution of the input image being 4032×3024, adjust the same into a resolution of 256×256 or a resolution of 480×480.

In an embodiment, the electronic device 101 can convert the resolution of the acquired input image based on the resolution conversion module 210 according to the control of the processor 120, to provide a plurality of images. For example, in response to the resolution of the input image being 4032×3024, the resolution conversion module 210 can provide an image (e.g., a first image) having a resolution of 256×256 and an image (e.g., a second image) having a resolution of 480×480.

In an embodiment, the electronic device 101 can convert a resolution of a portion of the input image based on the resolution conversion module 210 under the control of the processor 120 as well. For example, the portion of the input image can be a boundary of an object within the input image and a region other than the boundary, a character and a region other than the character, a bright region and a dark region, and/or a complex region and a simple region. A criterion of the regions can be set by a user, and can have been already set to the electronic device 101 as well. The processor 120 of the electronic device 101 can control the resolution conversion module 210 to convert the resolution of the portion of the input image and provide a plurality of images as well. For example, the processor 120 of the electronic device 101 can convert a resolution of a specific region of the input image, and can crop a portion of the input image and thereafter convert a resolution of the cropped portion as well. In this case, the processor 120 of the electronic device 101 can convert the resolution of the input image, thereby providing the plurality of images. Also, for another example, in response to the resolution conversion not being needed, the processor 120 of the electronic device 101 can just crop the portion of the input image, thereby providing the plurality of images.

According to an embodiment, operation 430 can include operation 431 and operation 432.

In operation 431 of an embodiment, the processor 120 of the electronic device 101 can process the resolution-converted image (e.g., the first image) by image segmentation processing (e.g., first image processing) which is based on deep learning through the first deep learning engine 221, and provide region segmentation information (e.g., first region segmentation information).

In an embodiment, the processor 120 of the electronic device 101 can forward the first image converting the resolution based on the resolution conversion module 210, to the first deep learning engine 221. For example, the first image can be an image having a resolution of 256×256.

In an embodiment, the first deep learning engine 221 of the electronic device 101 can perform the image segmentation processing (e.g., the first image processing) based on a parameter (e.g., a first parameter) different from that of the second deep learning engine 222. For example, the first deep learning engine 221 can perform the first image processing according to a high bit depth of 32 bits.

In an embodiment, the processor 120 of the electronic device 101 can provide the first region segmentation information after the first image processing which is based on the first deep learning engine 221. The first region segmentation information can be data provided as a result of performing the image segmentation processing according to the first bit depth (e.g., 32 bits).

In operation 432 of an embodiment, the processor 120 of the electronic device 101 can process the resolution-converted image (e.g., the second image) by image segmentation processing (e.g., second image processing) which is based on deep learning through the second deep learning engine 222, and provide region segmentation information (e.g., second region segmentation information).

In an embodiment, the processor 120 of the electronic device 101 can forward the second image converting the resolution based on the resolution conversion module 210, to the second deep learning engine 222. For example, the second image can be an image having a resolution of 480×480.

In an embodiment, the second deep learning engine 222 of the electronic device 101 can perform the image segmentation processing (e.g., the second image processing) based on a parameter (e.g., a second parameter) different from that of the first deep learning engine 221. For example, the second deep learning engine 222 can perform the second image processing according to a low bit depth of a second bit depth (e.g., 8 bits).

In an embodiment, the processor 120 of the electronic device 101 can provide the second region segmentation information after the second image processing which is based on the second deep learning engine 222. The second region segmentation information can be data provided as a result of performing the image segmentation processing according to the second bit depth (e.g., 8 bits).

According to an embodiment, in operation 440, the electronic device 101 can provide region segmentation information of the input image through synthesis that is based on the first region segmentation information and the second region segmentation information according to the control of the processor 120.

In an embodiment, the processor 120 of the electronic device 101 can control the synthesizing module 230 and synthesize the first region segmentation information and the second region segmentation information. For example, the synthesizing module 230 can synthesize the first region segmentation information which is provided based on the first bit depth (e.g., 32 bits) and the second region segmentation information which is provided based on the second bit depth (e.g., 8 bits). Also, the electronic device 101 can synthesize the first region segmentation information and the second region segmentation information, to provide the region segmentation information of the input image.

In an embodiment, the processor 120 of the electronic device 101 can control the synthesizing module 230 and synthesize the region segmentation information (e.g., the first region segmentation information or the second region segmentation information) with region segmentation information of one or more images stored in the memory 130 as well. For example, the region segmentation information of the one or more images stored in the memory 130 can be region segmentation information relating to a photographed image performing photographing through a user's photographing command as well, and can be region segmentation information relating to a preview image acquired through a sensor (e.g., the sensor module 176) of the electronic device 101 as well. The synthesizing module 230 of the electronic device 101 can synthesize the region segmentation information (e.g., the first region segmentation information or the second region segmentation information) and the region segmentation information relating to the photographed image stored in the memory 130, according to the control of the processor 120. Also, the synthesizing module 230 of the electronic device 101 can synthesize the region segmentation information (e.g., the first region segmentation information or the second region segmentation information) and the region segmentation information relating to the preview image stored in the memory 130, according to the control of the processor 120 as well.

In an embodiment, using the first deep learning engine 221 and the second deep learning engine 222 of the same parameter, the electronic device 101 can perform image segmentation processing for images of different resolutions according to the control of the processor 120.

In an embodiment, using the first deep learning engine 221 and the second deep learning engine 222 of mutually different parameters, the electronic device 101 can perform image segmentation processing for images of the same resolution. For example, in response to a resolution of an input image being 4032×3024, the electronic device 101 can perform image segmentation processing for images having a resolution of 256×256 converting a resolution, based on deep learning engines (e.g., the first deep learning engine 221 of 8 bits and the second deep learning engine 222 of 32 bits) of mutually different bit depths (e.g., 8 bits and 32 bits).

A combination of the resolution of the input image and the parameters of the deep learning engines (e.g., the first deep learning engine 221 and the second deep learning engine 222) in the electronic device 101 of various embodiments is not limited to the aforementioned example and can be implemented variously.

In an embodiment, the electronic device 101 can perform the image segmentation processing which is based on the first deep learning engine 221 and the second deep learning engine 222, as a serial (or subsequent) operation, not a parallel operation as illustrated in FIG. 4.

In the electronic device 101 of an embodiment, the parameters related with the first deep learning engine 221 and the second deep learning engine 222 can be various. For example, the parameters can include parameters of the bit depth and the resolution. The parameters can be parameters of a processing IP such as, for example, and without limitation, a CPU, a GPU, a DSP, an NPU, or the like.

A combination of the parameters applicable to the first deep learning engine 221 and the second deep learning engine 222 of the electronic device 101 of an embodiment can be various. For example, the first deep learning engine 221 and the second deep learning engine 222 of the electronic device 101 can variously employ combinations of the bit depth, the resolution, and a speed of the processing IP. For example, for example, the first deep learning engine 221 can employ a parameter combination of a high bit depth, a high resolution, and a fast processing IP, and the second deep learning engine 222 can employ a combination of a low bit depth, a low resolution, and a slow processing IP. For another example, the first deep learning engine 221 can employ a combination of a high bit depth, a low resolution, and a fast processing IP, and the second deep learning engine 222 can employ a combination of a low bit depth, a low resolution, and a slow processing IP. Also, the first deep learning engine 221 can employ a combination of a low bit depth, a high resolution, and a fast processing IP, and the second deep learning engine 222 can employ a combination of a low bit depth, a low resolution, and a slow processing IP.

The combination of the parameters applicable to the first deep learning engine 221 and the second deep learning engine 222 of the electronic device 101 of an embodiment may not be limited to the aforementioned example.

The synthesizing of the first region segmentation information and the second region segmentation information of an embodiment is described in greater detail below with reference to FIGS. 5 and 6.

Figure 5:
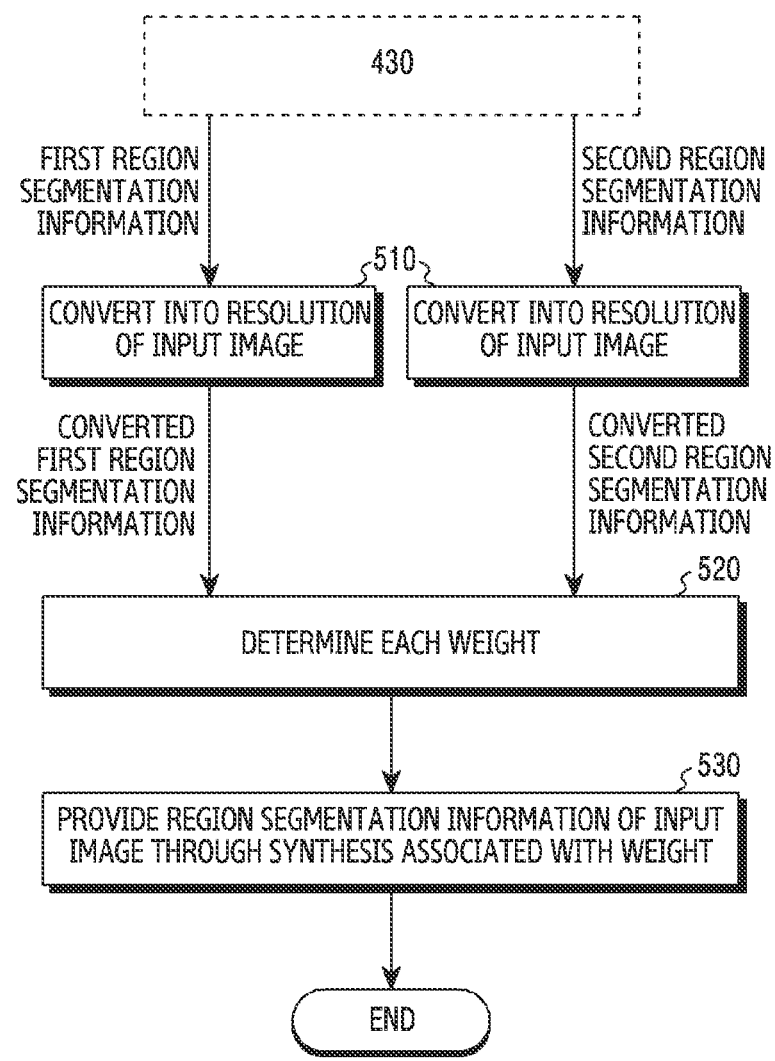
FIG. 5 is a flowchart illustrating an example process of providing an output image based on a weight in an electronic device according to various embodiments.

FIG. 5 is a flowchart illustrating an example process of providing an output image based on a weight in the electronic device 101 according to various embodiments.

According to an embodiment, in operation 430 described with reference to FIG. 4, the electronic device 101 can provide first region segmentation information and second region segmentation information according to the control of the processor 120. For example, the first region segmentation information can be data provided as a result of performing image segmentation processing according to a bit depth of 32 bits, and the second region segmentation information can be data provided as a result of performing image segmentation processing according to a bit depth of 8 bits. Also, the electronic device 101 can provide the first region segmentation information that is based on a high bit depth (e.g., 32 bits) using a GPU, and can provide the second region segmentation information that is based on a low bit depth (e.g., 8 bits) using a DSP.

According to an embodiment, in operation 510, the electronic device 101 can convert a resolution of each of the first region segmentation information and the second region segmentation information into a resolution of an input image under the control of the processor 120.

In an embodiment, the processor 120 of the electronic device 101 can control the resolution conversion module 210 and convert the first region segmentation information into the resolution of the input image. For example, the resolution conversion module 210 of the electronic device 101 can convert the first region segmentation information provided as the result of performing the image segmentation processing according to the bit depth of 32 bits, into the resolution of the input image acquired in operation 410.

In an embodiment, the processor 120 of the electronic device 101 can control the resolution conversion module 210 and convert the second region segmentation information into the resolution of the input image. For example, the resolution conversion module 210 can convert the second region segmentation information provided as a result of performing the image segmentation processing according to the bit depth of 8 bits, into the resolution of the input image acquired in operation 410.

According to an embodiment, in operation 520, the processor 120 of the electronic device 101 can determine a weight of each of the first region segmentation information and the second region segmentation information converting the resolution.

In an embodiment, the synthesizing module 230 of the electronic device 101 can determine weight information (e.g., first weight information and second weight information) associated with a region of the input image of the result data (e.g., the first region segmentation information and the second region segmentation information) according to the control of the processor 120. For example, the synthesizing module 230 of the electronic device 101 can determine the first weight information which will be applied to a boundary region of an object among the input image in the first region segmentation information. Also, the synthesizing module 230 of the electronic device 101 can determine the second weight information which will be applied to a region other than the boundary of the object among the input image in the second region segmentation information according to the control of the processor 120. For example, the synthesizing module 230 can determine the first weight information in which the boundary region of the object has a high weight and the region other than the boundary of the object has a low weight, in the first region segmentation information. In this case, owing to the high weight, image segmentation for the boundary region of the object can be performed better than image segmentation for the region other than the boundary of the object.

In an embodiment, the synthesizing module 230 of the electronic device 101 can determine the second weight information in which the boundary region of the object has a low weight and the region other than the boundary of the object has a high weight, in the second region segmentation information. For another example, the synthesizing module 230 of the electronic device 101 can determine the first weight information which will be applied to a region of a character among the input image in the first region segmentation information, and can determine the second weight information which will be applied to a region other than the character among the input image in the second region segmentation information. In this case, owing to the high weight, image segmentation for the region other than the boundary of the object can be performed better than image segmentation for the boundary region of the object.

In an embodiment, the region of the input image can be a bright region and a dark region, and/or a complex region and a simple region. The region of the input image associated with the weight information (e.g., the first weight information or the second weight information) is not limited to the aforementioned example.

According to an embodiment, in operation 530, the electronic device 101 can provide region segmentation information of the input image through synthesis associated with each weight according to the control of the processor 120.

In an embodiment, the processor 120 of the electronic device 101 can control the synthesizing module 230 and synthesize the converted first region segmentation information for a region (e.g., the boundary region of the object of the high weight and the region other than the boundary of the object of the low weight) employing the first weight information, and the converted second region segmentation information for a region (e.g., the boundary region of the object of the low weight and the region other than the boundary of the object of the high weight) employing the second weight information.

In an embodiment, the processor 120 of the electronic device 101 can control the synthesizing module 230 and provide the region segmentation information of the input image through the synthesis associated with the weight. For example, the processor 120 can synthesize the first region segmentation information applying the high weight to the boundary region of the object and the second region segmentation information applying the high weight to the region other than the boundary of the object, to provide the region segmentation information of the input image.

Figure 6:
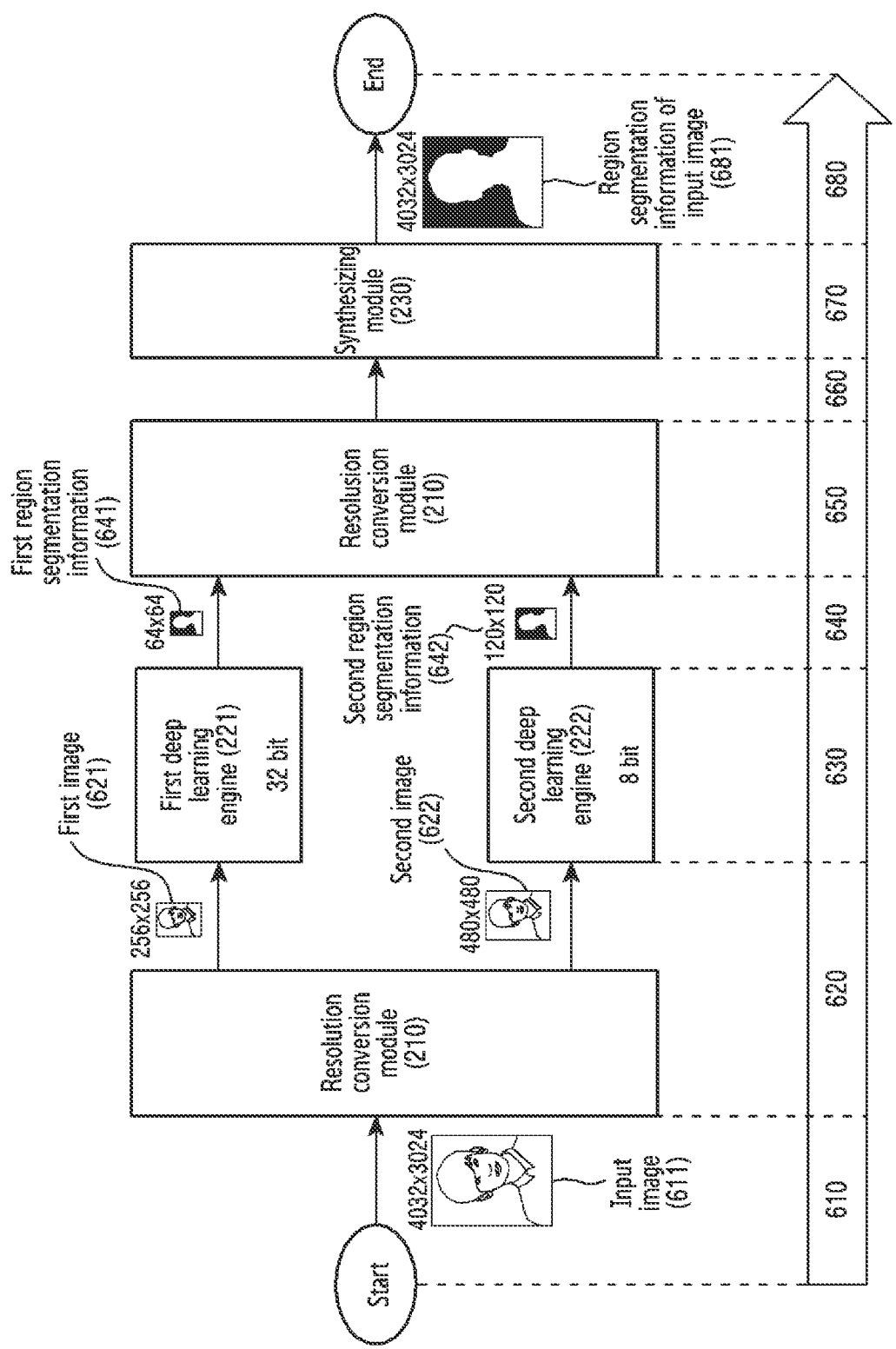
FIG. 6 is a flow diagram illustrating an example process of providing an output image from an input image in an electronic device according to various embodiments.

FIG. 6 is a flowchart illustrating an example process of providing region segmentation information of an input image from the input image in the electronic device 101 according to various embodiments. Operation 610 to operation 680 of the electronic device 101 of various embodiments can be performed under the control of the processor 120.

According to an embodiment, in operation 610, the electronic device 101 can acquire an input image 611 based on the camera 108. For example, the input image 611 can be an image having a resolution of 4032×3024. Also, the processor 120 of the electronic device 101 can forward the input image 611 to the resolution conversion module 210.

According to an embodiment, in operation 620, the electronic device 101 can convert the input image 611 into two images (e.g., a first image 621 and a second image 622) having different resolutions through the resolution conversion module 210. For example, the resolution conversion module 210 of the electronic device 101 can convert the input image 611 into a first image 621 having a resolution of 256×256. Also, the resolution conversion module 210 of the electronic device 101 can convert the input image 611 into a second image 622 having a resolution of 480×480.

The resolution of the first image 621 or the second image 622 of an embodiment is not limited to the aforementioned example, and can be variously set by a user according to a purpose or can have been set to the electronic device 101.

According to an embodiment, in operation 630, the electronic device 101 can perform image segmentation processing for two images (e.g., the first image and the second image) having different resolutions based on a plurality of deep learning engines (e.g., the first deep learning engine 211 and the second deep learning engine 222).

In an embodiment, the first deep learning engine 221 can receive the first image 621 having a specific resolution (e.g., a resolution of 256×256) from the resolution conversion module 210.

In an embodiment, the first deep learning engine 221 can perform image segmentation processing (e.g., first image processing) which is based on a set parameter (e.g., a bit depth of 32 bits). For example, the first image processing can be image segmentation processing which is based on deep learning.

In an embodiment, the first deep learning engine 221 can provide region segmentation information (e.g., first region segmentation information 641) having a specific resolution (e.g., a resolution of 64×64), after the execution of the image segmentation processing (e.g., the first image processing). The resolution of the region segmentation information is not limited to the aforementioned example, and can be various according to the setting of the first deep learning engine 221.

In an embodiment, the second deep learning engine 222 can receive the second image 622 having a specific resolution (e.g., a resolution of 480×480) from the resolution conversion module 210.

In an embodiment, the second deep learning engine 222 can perform image segmentation processing (e.g., second image processing) which is based on a set parameter (e.g., a bit depth of 8 bits). For example, the second image processing can be image segmentation processing which is based on deep learning.

In an embodiment, the second deep learning engine 222 can provide region segmentation information (e.g., second region segmentation information 642) having a specific resolution (e.g., a resolution of 120×120), after the execution of the image segmentation processing (e.g., the second image processing). The resolution of the region segmentation information is not limited to the aforementioned example, and can be various according to the setting of the second deep learning engine 222.

According to an embodiment, in operation 640, the electronic device 101 can forward the region segmentation information (e.g., the first region segmentation information 641 and the second region segmentation information 642) to the resolution conversion module 210. For example, the electronic device 101 can forward the first region segmentation information 641 having the resolution of 64×64 and the second region segmentation information 642 having the resolution of 120×120 to the resolution conversion module 210 using the processor 120.

According to an embodiment, in operation 650, the electronic device 101 can convert the region segmentation information (e.g., the first region segmentation information 641 and the second region segmentation information 642) into the resolution (e.g., the resolution of 4032×3024) of the input image 611 based on the resolution conversion module 210. For example, the electronic device 101 can convert the first region segmentation information 641 having the resolution of 64×64 and the second region segmentation information 642 having the resolution of 120×120, into the resolution of 4032×3024.

According to an embodiment, in operation 660, the electronic device 101 can forward the region segmentation information (e.g., the first region segmentation information 641 and the second region segmentation information 642) converting into the resolution (e.g., the resolution of 4032×3024) of the input image 611, to the synthesizing module 230. For example, the electronic device 101 can forward the first region segmentation information 641 and the second region segmentation information 642 performing resolution conversion into the resolution of (e.g., the resolution of 4032×3024) of the input image in the resolution conversion module 210, to the synthesizing module 230, using the processor 120.

According to an embodiment, in operation 670, the electronic device 101 can synthesize the first region segmentation information 641 and the second region segmentation information 642 performing the resolution conversion.

In an embodiment, the electronic device 101 can synthesize the first region segmentation information 641 and the second region segmentation information 642 performing the resolution conversion into the resolution (e.g., the resolution of 4032×3024) of the input image.

In an embodiment, the electronic device 101 can synthesize the first region segmentation information 641 and the second region segmentation information 642 performing the resolution conversion into the resolution (e.g., the resolution of 4032×3024) of the input image according to each weight.

In an embodiment, the synthesizing module 230 of the electronic device 101 can determine each weight of the region segmentation information (e.g., the first region segmentation information 641 and the second region segmentation information 642 performing the resolution conversion) performing the resolution conversion into the resolution (e.g., the resolution of 4032×3024) of the input image 611 according to operation 650. For example, the synthesizing module 230 of the electronic device 101 can determine weight information (e.g., first weight information) which will be applied to a boundary region of an object among an image in the first region segmentation information 641 performing the resolution conversion according to operation 650. Also, the synthesizing module 230 of the electronic device 101 can determine a weight (e.g., second weight information) which may be applied to a region other than the boundary of the object among the image in the second region segmentation information 642 performing the resolution conversion according to operation 650. For detailed example, the synthesizing module 230 can determine the boundary region of the object as a high weight and determine the region other than the boundary of the object as a low weight, in the first region segmentation information 641 performing the resolution conversion according to operation 650. Also, the synthesizing module 230 can determine the boundary region of the object as a low weight and determine the region other than the boundary of the object as a high weight, in the second region segmentation information 642 performing the resolution conversion according to operation 650. For another example, the synthesizing module 230 of the electronic device 101 can determine a weight which will be applied to a region of a character among an input image in the first region segmentation information performing the resolution conversion according to operation 650, and can determine a weight which will be applied to a region other than the character among the input image in the second region segmentation information performing the resolution conversion according to operation 650 as well. Also, a region of the image related to the weight is not limited to the aforementioned example.

In an embodiment, the synthesizing module 230 of the electronic device 101, for example, can synthesize information about the boundary region of the object of the high weight and the region other than the boundary of the object of the low weight in the first region segmentation information, and the boundary region of the object of the low weight and the region other than the boundary of the object of the high weight in the second region segmentation information. For example, the first weight information in the first region segmentation information can be information in which the boundary region of the object has the low weight, and the region other than the boundary of the object has the high weight, and the second weight information in the second region segmentation information can be information in which the boundary region of the object has the high weight, and the region other than the boundary of the object has the low weight. The electronic device 101 can synthesize the first region segmentation information and the second region segmentation information based on the first weight information and the second weight information according to the control of the processor 120.

According to an embodiment, in operation 680, the electronic device 101 can provide region segmentation information 681 of the input image having the resolution of 4032× 3024. For example, the electronic device 101 can synthesize the first region segmentation information 641 and the second region segmentation information 642 performing the resolution conversion into the resolution (e.g., the resolution of 4032×3024) of the input image, to provide the region segmentation information 681 of the input image having the same resolution as the resolution (e.g., the resolution of 4032×3024) of the input image. For another example, the electronic device 101 can synthesize the first region segmentation information 641 and the second region segmentation information 642 performing the resolution conversion into the resolution (e.g., the resolution of 4032×3024) of the input image according to each weight information (e.g., the first weight information or the second weight information), to provide the region segmentation information 681 of the input image having the same resolution as the resolution (e.g., the resolution of 4032×3024) of the input image.

A method for image segmentation based on deep learning in an electronic device (e.g., the electronic device 101) of an example embodiment can include: acquiring an input image by a processor (e.g., the processor 120) of the electronic device (e.g., the electronic device 101), converting, by the processor, the input image into a first image having a first resolution and a second image having a second resolution, performing, by the processor (e.g., the processor 120), first image processing for the first image using a first deep learning engine (e.g., the first deep learning engine 221), performing, by the processor (e.g., the processor 120), second image processing for the second image using a second deep learning engine (e.g., the second deep learning engine 222) different from the first deep learning engine (e.g., the first deep learning engine 221), and providing, by the processor (e.g., the processor 120), region segmentation information of the input image based on first region segmentation information associated with the first image processing and second region segmentation information associated with the second image processing.

In the method for image segmentation based on the deep learning of the electronic device (e.g., the electronic device 101) of an example embodiment, providing the region segmentation information of the input image can further include synthesizing the first region segmentation information and the second region segmentation information.

The method for image segmentation based on the deep learning of the electronic device (e.g., the electronic device 101) of an example embodiment can include:
converting the first region segmentation information and the second region segmentation information into a resolution of the input image, determining first weight information for the converted first region segmentation information, determining second weight information for the converted second region segmentation information, and providing the region segmentation information of the input image based on the first weight information and the second weight information.

In the method for image segmentation based on the deep learning of the electronic device (e.g., the electronic device 101) of an example embodiment, the first weight information and the second weight information can be set differently according to regions of the input image.

In the method for image segmentation based on the deep learning of the electronic device (e.g., the electronic device 101) of an example embodiment, the regions of the input image can at least include a boundary region of an object and a region other than the boundary, a character region and a region other than the character, a bright region and a dark region, and/or a complex region and a simple region.

The method for image segmentation based on the deep learning of the electronic device (e.g., the electronic device 101) of an example embodiment can include performing the first image processing for the first image based on a first parameter, by the first deep learning engine (e.g., the first deep learning engine 221), and performing the second image processing for the second image based on a second parameter distinct from the first parameter, by the second deep learning engine (e.g., the second deep learning engine 222).

In the method for image segmentation based on the deep learning of the electronic device (e.g., the electronic device 101) of an example embodiment, the first parameter and the second parameter can be parameters for at least one of a bit depth, a resolution, and/or a processing IP.

In the method for image segmentation based on the deep learning of the electronic device (e.g., the electronic device 101) of an example embodiment, providing the region segmentation information of the input image can further include synthesizing region segmentation information stored in a memory (e.g., the memory 130) and the first region segmentation information or second region segmentation information.

The method for image segmentation based on the deep learning of the electronic device (e.g., the electronic device 101) of an example embodiment can include performing the first image processing for the first image based on a first parameter, by the first deep learning engine (e.g., the first deep learning engine 221), and performing the second image processing for the second image based on the first parameter, by the second deep learning engine (e.g., the second deep learning engine 222).

In the method for image segmentation based on the deep learning of the electronic device (e.g., the electronic device 101) of an example embodiment, the first resolution of the first image can be the same as the second resolution of the second image.

An electronic device (e.g., the electronic device 101) of an example embodiment can include: a memory (e.g., the memory 130), and a processor (e.g., the processor 120) operably connected to the memory (e.g., the memory 130). The processor (e.g., the processor 120) can be configured to: acquire an input image, convert the input image into a first image having a first resolution and a second image having a second resolution, perform first image processing for the first image using a first deep learning engine (e.g., the first deep learning engine 221), perform second image processing for the second image using a second deep learning engine (e.g., the second deep learning engine 222) different from the first deep learning engine (e.g., the first deep learning engine 221), and provide region segmentation information of the input image based on first region segmentation information associated with the first image processing and second region segmentation information associated with the second image processing.

In the electronic device (e.g., the electronic device 101) of an example embodiment, the processor (e.g., the processor 120) can be configured to: synthesize the first region segmentation information and the second region segmentation information.

In the electronic device (e.g., the electronic device 101) of an example embodiment, the processor (e.g., the processor 120) can be configured to: convert the first region segmentation information and the second region segmentation information into a resolution of the input image, determine first weight information for the converted first region segmentation information and determine second weight information for the converted second region segmentation information, and provide the region segmentation information of the input image based on the first weight information and the second weight information.

In the electronic device (e.g., the electronic device 101) of an example embodiment, the first weight information and the second weight information can be set differently according to regions of the input image.

In the electronic device (e.g., the electronic device 101) of an example embodiment, the regions of the input image can at least include a boundary region of an object and a region other than the boundary, a character region and a region other than the character, a bright region and a dark region, and/or a complex region and a simple region.

In the electronic device (e.g., the electronic device 101) of an example embodiment, the first deep learning engine (e.g., the first deep learning engine 221) can perform the first image processing for the first image based on a first parameter, and the second deep learning engine (e.g., the second deep learning engine 222) can perform the second image processing for the second image based on a second parameter distinct from the first parameter.

In the electronic device (e.g., the electronic device 101) of an example embodiment, the first parameter and the second parameter can be parameters for at least one of a bit depth, a resolution, and/or a processing IP.

In the electronic device (e.g., the electronic device 101) of an example embodiment, the processor (e.g., the processor 120) can be configured to synthesize region segmentation information stored in a memory (e.g., the memory 130) and the first region segmentation information or second region segmentation information.

In the electronic device (e.g., the electronic device 101) of an example embodiment, the processor (e.g., the processor 101) can be configured to: perform the first image processing for the first image based on a first parameter, by the first deep learning engine (e.g., the first deep learning engine 221), and perform the second image processing for the second image based on the first parameter, by the second deep learning engine (e.g., the second deep learning engine 222).

In the electronic device (e.g., the electronic device 101) of an example embodiment, the first resolution of the first image can be the same as the second resolution of the second image.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method for image segmentation based on deep learning in an electronic device, the method comprising:

acquiring, by at least one processor of the electronic device comprising processing circuit, an input image;

converting, by the at least one processor, the input image into a first image having a first resolution and a second image having a second resolution;

performing, by the at least one processor, first image processing for the first image using a first deep learning engine;

performing, by the at least one processor, second image processing for the second image using a second deep learning engine different from the first deep learning engine;

providing, by the at least one processor, region segmentation information of the input image based on first region segmentation information associated with the first image processing and second region segmentation information associated with the second image processing;

converting, by the at least one processor, the first region segmentation information and the second region segmentation information into a resolution of the input image;

determining, by the at least one processor, first weight information for the converted first region segmentation information and determining second weight information for the converted second region segmentation information; and providing, by the at least one processor, the region segmentation information of the input image based on the first weight information and the second weight information.

2. The method for image segmentation of claim 1, wherein providing the region segmentation information of the input image further comprises synthesizing the first region segmentation information and the second region segmentation information.

3. The method for image segmentation of claim 1, wherein the first weight information and the second weight information are set differently according to regions of the input image.

4. The method for image segmentation of claim 3, wherein the regions of the input image at least comprise: a boundary region of an object and a region other than the boundary region, a character region and a region other than the character region, a bright region and a dark region, and/or a complex region and a simple region.

5. The method for image segmentation of claim 1, comprising:

performing, by the first deep learning engine, the first image processing for the first image based on a first parameter; and performing, by the second deep learning engine, the second image processing for the second image based on a second parameter different from the first parameter.

6. The method for image segmentation of claim 5, wherein the first parameter and the second parameter include parameters for at least one of a bit depth, a resolution, and/or a processing IP.

7. The method for image segmentation of claim 1, wherein providing the region segmentation information of the input image further comprises: synthesizing region segmentation information stored in a memory and the first region segmentation information or the second region segmentation information.

8. The method for image segmentation of claim 1, comprising:

performing, by the first deep learning engine, the first image processing for the first image based on a first parameter; and performing, by the second deep learning engine, the second image processing for the second image based on the first parameter.

9. The method for image segmentation of claim 1, wherein the first resolution of the first image is the same as the second resolution of the second image.

10. An electronic device comprising:
a memory; and
at least one processor comprising processing circuitry and operably connected to the memory,
wherein the at least one processor, individually and/or collectively, is configured to:
acquire an input image;
convert the input image into a first image having a first resolution and a second image having a second resolution;
perform first image processing for the first image using a first deep learning engine;
perform second image processing for the second image using a second deep learning engine different from the first deep learning engine;
provide region segmentation information of the input image based on first region segmentation information associated with the first image processing and second region segmentation information associated with the second image processing;
convert the first region segmentation information and the second region segmentation information into a resolution of the input image;
determine first weight information for the converted first region segmentation information and determine second weight information for the converted second region segmentation information; and
provide the region segmentation information of the input image based on the first weight information and the second weight information.

11. The electronic device of claim 10, wherein the at least one processor, individually and/or collectively, is configured to synthesize the first region segmentation information and the second region segmentation information.

12. The electronic device of claim 10, wherein the first weight information and the second weight information are set differently according to regions of the input image.

13. The electronic device of claim 12, wherein the regions of the input image at least comprise: a boundary region of an object and a region other than the boundary region, a character region and a region other than the character region, a bright region and a dark region, and/or a complex region and a simple region.

14. The electronic device of claim 10, wherein
the first deep learning engine is configured to perform the first image processing for the first image based on a first parameter, and
the second deep learning engine is configured to perform the second image processing for the second image based on a second parameter different from the first parameter.

15. The electronic device of claim 14, wherein the first parameter and the second parameter include parameters for at least one of a bit depth, a resolution, and/or a processing IP.

16. The electronic device of claim 10, wherein the at least one processor, individually and/or collectively, is configured to synthesize region segmentation information stored in a memory and the first region segmentation information or the second region segmentation information.

17. The electronic device of claim 10, wherein the at least one processor, individually and/or collectively, is configured to:
perform, by the first deep learning engine, the first image processing for the first image based on a first parameter; and
perform, by the second deep learning engine, the second image processing for the second image based on the first parameter.

18. The electronic device of claim 10, wherein the first resolution of the first image is the same as the second resolution of the second image.

* * * * *